United States Patent
Taylor

(10) Patent No.: US 6,666,230 B1
(45) Date of Patent: Dec. 23, 2003

(54) PRESSURE RELIEF SYSTEM WITH TRIGGER ACTIVATED VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 0 days.

(21) Appl. No.: 10/159,578

(22) Filed: May 31, 2002

(51) Int. Cl.[7] .............................................. F16K 17/40
(52) U.S. Cl. ................................... 137/624.27; 137/70
(58) Field of Search ............................... 137/68.11, 70, 137/624.27; 251/58, 73, 77, 81, 95, 63.4, 297

(56) References Cited

U.S. PATENT DOCUMENTS

| | | | |
|---|---|---|---|
| 3,040,772 A | * 6/1962 | Todd | 137/509 |
| 3,542,052 A | 11/1970 | Irwin | |
| 3,730,214 A | * 5/1973 | Brumm | 137/488 |
| 3,823,739 A | * 7/1974 | McMullan | 137/624.27 |
| 4,523,602 A | * 6/1985 | Snyder | 137/467 |
| 4,564,169 A | * 1/1986 | Nordlund | 251/58 |
| 4,724,857 A | 2/1988 | Taylor | |
| 4,949,936 A | * 8/1990 | Messina | 251/58 |
| 5,012,834 A | * 5/1991 | Taylor | 137/70 |
| 5,067,511 A | 11/1991 | Taylor | |
| 5,146,942 A | 9/1992 | Taylor | |
| 5,297,575 A | 3/1994 | Taylor | |
| 5,318,060 A | 6/1994 | Taylor | |
| 5,433,239 A | 7/1995 | Taylor | |
| 5,462,086 A | 10/1995 | Taylor et al. | |
| 5,575,306 A | 11/1996 | Taylor | |
| 5,685,329 A | 11/1997 | Taylor | |
| 6,155,284 A | 12/2000 | Scantlin | |
| 6,325,088 B1 | 12/2001 | Scantlin | |

FOREIGN PATENT DOCUMENTS

| | | |
|---|---|---|
| GB | 2196096 A | 4/1988 |
| GB | 2247300 A | 2/1992 |

* cited by examiner

*Primary Examiner*—John Rivell
*Assistant Examiner*—Ramesh Krishnamurthy
(74) *Attorney, Agent, or Firm*—Fellers, Snider, et al.

(57) ABSTRACT

A pressure relief system is provided to detect and abate an overpressure condition in a pressurized fluid. An actuator assembly establishes an overpressure path for the pressurized fluid when a pressure of the pressurized fluid reaches a predetermined level, and includes an extension sleeve which extends into a housing interior chamber along a selected axis. A pressure response assembly includes a pressure responsive member which mechanically fails when the pressure reaches the predetermined level and a trigger member which extends into the extension sleeve. Retention members (preferably ball bearings) are recessed within cavities formed in the housing to prevent axial movement of the extension sleeve prior to mechanical failure of the pressure responsive member, and thereafter allow axial movement of the extension sleeve upon failure of the pressure responsive member. Movement of the extension sleeve allows the actuator assembly to rotate a quarter-turn valve to an open or closed position.

20 Claims, 8 Drawing Sheets

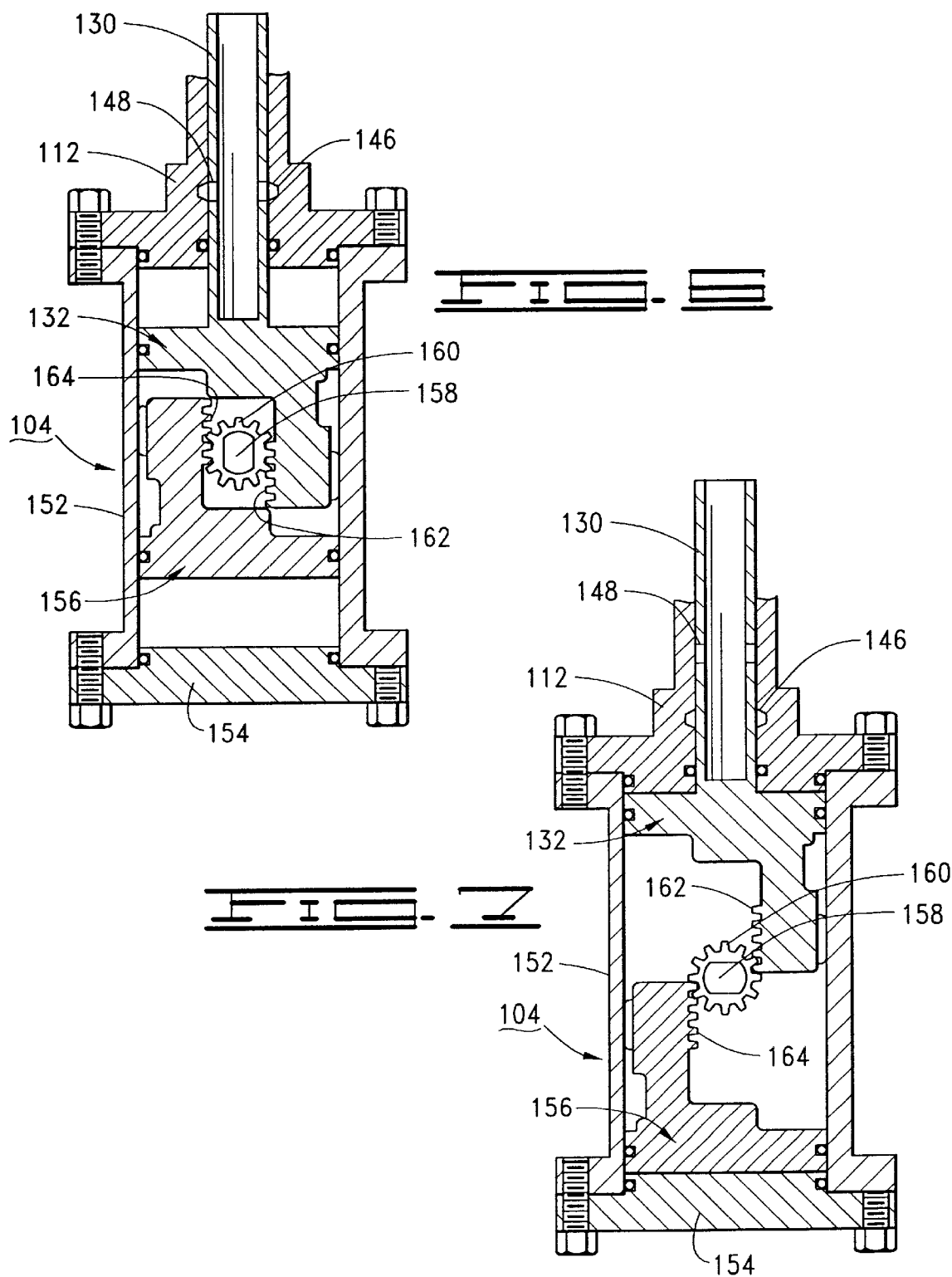

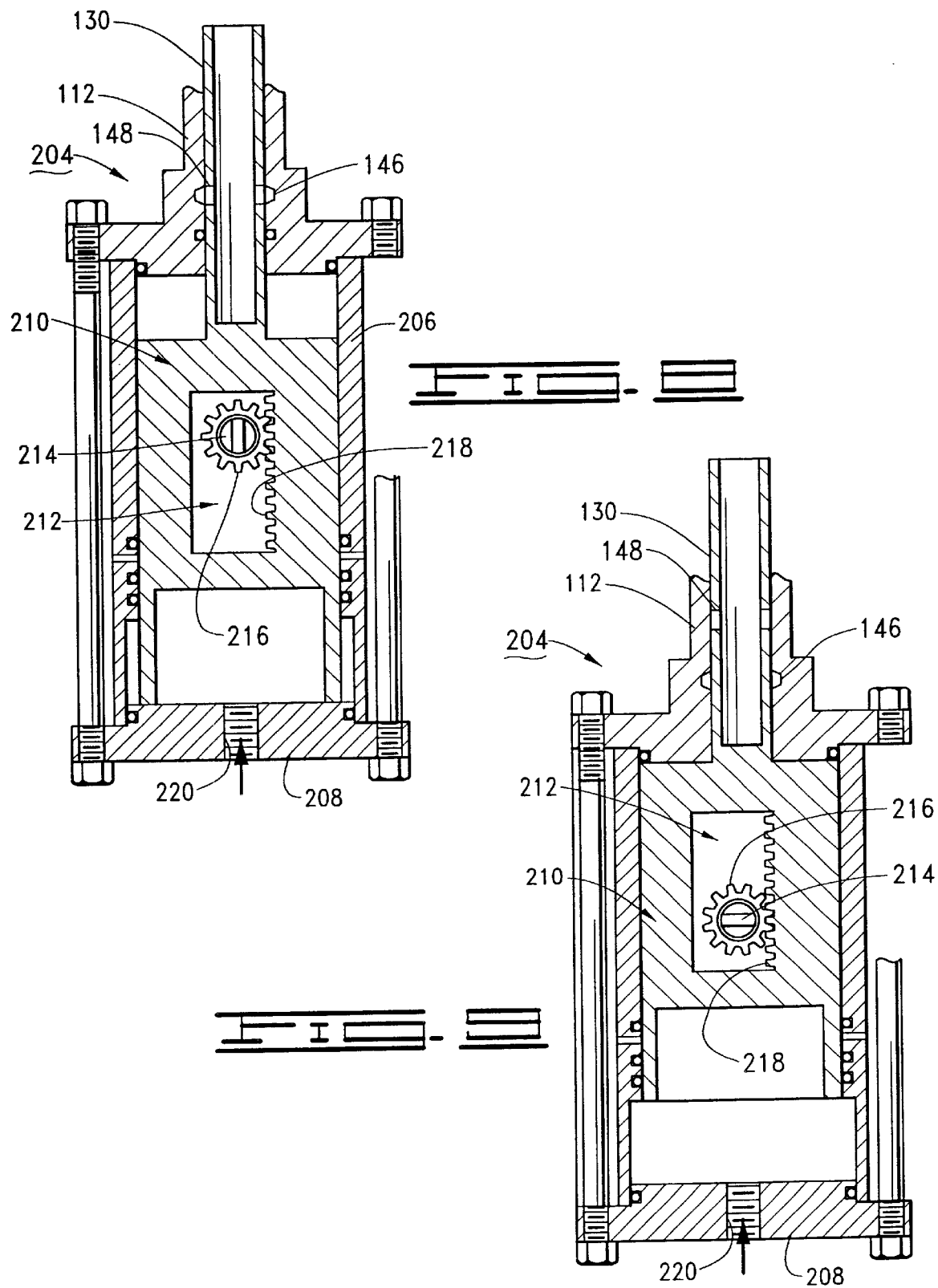

PRESSURE RELIEF SYSTEM WITH TRIGGER ACTIVATED VALVE

FIELD OF THE INVENTION

The present invention relates generally to pressurized fluid systems and more particularly, but not by way of limitation, to a pressure relief system which uses a trigger assembly with a collapsible member to establish a bypass or shutdown path for a pressurized fluid in response to an overpressure condition.

BACKGROUND

Pressurized fluid systems are typically provided with pressure relief capabilities to prevent the possibility of injury to humans and damage to equipment in the event of an overpressure condition. Such pressure relief systems often use a pressure responsive member that mechanically fails when subjected to a large increase in fluid pressure above a desired setpoint.

A particularly advantageous pressure relief system uses a buckling pin arrangement such as taught by U.S. Pat. No. 4,724,857 issued to Taylor. In such a system, the pin is placed under compressive load along an axial length of the pin by the pressure of the fluid. A sufficient increase in fluid pressure above a nominal operational level causes the pin to buckle, or collapse, allowing a plunger or other mechanism to move to a position where an overpressure path can be established to direct the fluid to reduce the pressure to a safe operational level. Such overpressure path can be established, for example, by opening a bypass valve or closing a shutoff valve.

While operable, it is desirable to isolate the operation of the buckling pin or other pressure responsive member from system forces associated with establishing the overpressure path for the fluid. For example, friction forces and fluid pressure can tend to offset the compressive load upon a buckling pin if the pin actuation and the valve are directly coupled. This can result in undesirably raising the set point at which the pressure responsive member begins to fail.

There is therefore a continued need for improvements in the art to increase the accuracy and repeatability of pressure relief systems, and it is to such improvements that the present invention is directed.

SUMMARY OF THE INVENTION

A pressure relief system is provided to detect and abate an overpressure condition in a pressurized fluid. In accordance with preferred embodiments, the system includes a housing having a housing interior surface which defines a housing interior chamber. The housing interior chamber extends along a selected axis.

An actuator assembly is coupled to the housing and is configured to establish an overpressure path for the pressurized fluid when a pressure of the pressurized fluid reaches a predetermined level. The actuator assembly comprises an extension sleeve which extends into and along the housing interior chamber, the extension sleeve having an extension sleeve outer surface in close proximity to the housing interior surface. The extension sleeve further has an extension sleeve interior surface which defines an extension sleeve interior chamber, said extension sleeve interior chamber extending along the selected axis.

A pressure response assembly is also coupled to the housing and comprises a pressure responsive member (such as a buckling pin) configured to mechanically fail in response to application of a compressive force established when the pressurized fluid reaches the predetermined level. The pressure response assembly further comprises a trigger member coupled to the pressure responsive member, the trigger member extending into and along the extension sleeve interior chamber. The trigger member comprises a first stem portion having a first stem outer surface in close proximity to the extension sleeve interior surface.

A number of retention members (preferably ball bearings) are provided adjacent the first stem portion of the trigger member. Each retention member extends through an aperture in the extension sleeve and into a recessed cavity formed in the housing interior surface.

The retention members prevent axial movement of the extension sleeve along the selected axis while the first stem portion remains adjacent the retention member. Upon mechanical failure of the pressure responsive member, the first stem portion is advanced along the selected axis past the retention member to allow the extension sleeve to advance the retention member out of the recessed cavity and along the housing interior chamber as the extension sleeve moves along the selected axis. The overpressure path for the pressurized fluid is established by the actuator assembly as the extension sleeve moves along the selected axis.

In this way, the trigger member, the extension sleeve and the retention members cooperate to function similarly to a "quick-disconnect" coupler, and system forces associated with the actuator assembly do not undesirably affect the set point at which the pressure responsive member begins to mechanically fail.

These and various other features and advantages which characterize the claimed invention will become apparent upon reading the following detailed description and upon reviewing the associated drawings.

BRIEF DESCRIPTION OF THE DRAWINGS

FIG. 1 shows the system operating in a steady state condition.

FIG. 6 is a cross-sectional view of the actuator assembly generally taken along line 6—6 in FIG. 1.

FIG. 7 is a cross-sectional view of the actuator assembly generally taken along line 7—7 in FIG. 2.

FIG. 8 is a cross-sectional view of an alternative actuator assembly which can used in substitution for the actuator assembly of FIG. 1, with the actuator assembly of FIG. 8 shown in a steady state condition.

FIG. 9 is a cross-sectional view of the actuator assembly of FIG. 8 in an overpressure condition configuration.

DETAILED DESCRIPTION

Figure 1:
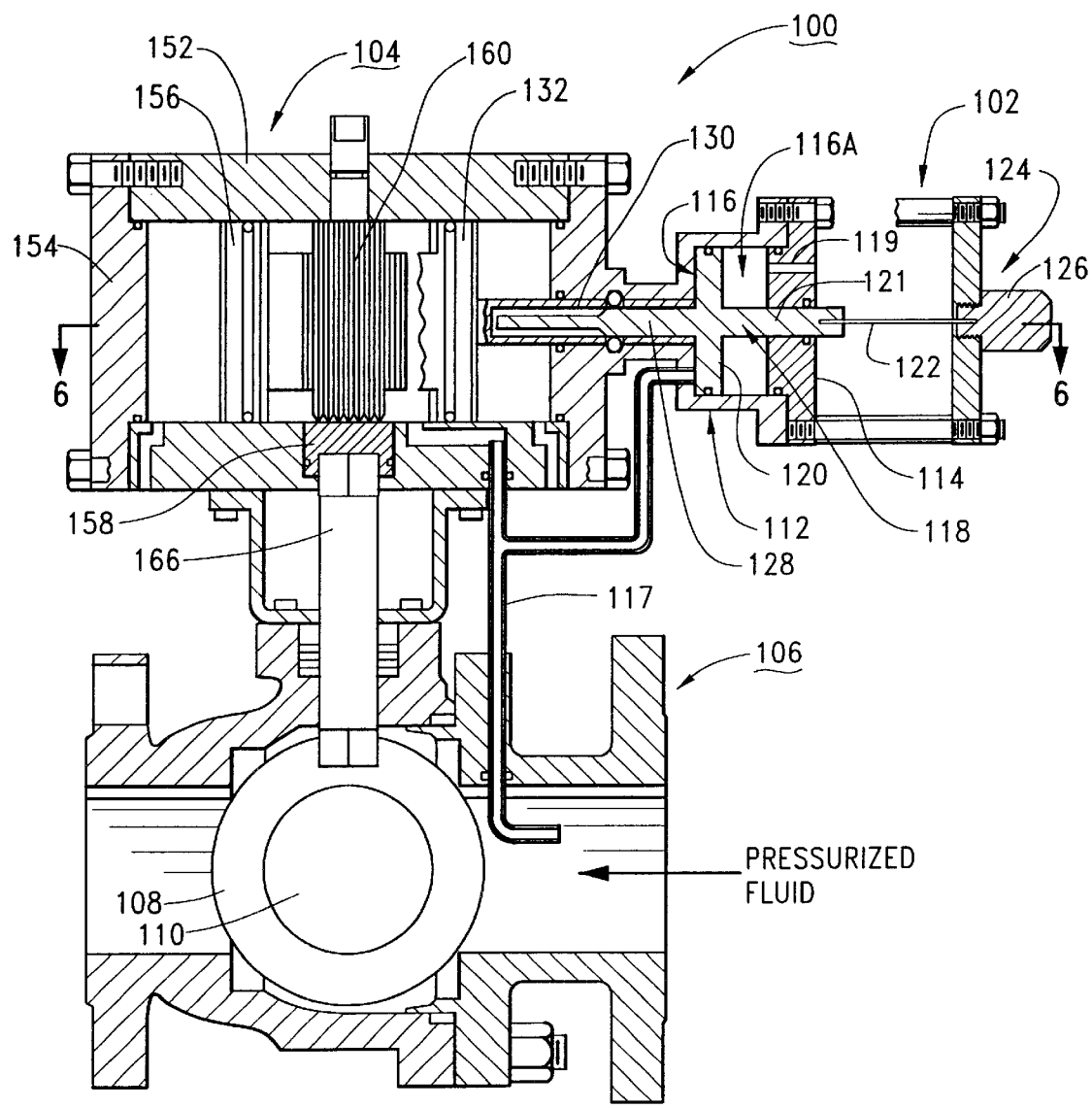
FIG. 1 is a partial cross-sectional view of a pressure relief system constructed and operated in accordance with preferred embodiments of the present invention and having a normally closed (NC) pressure relief valve.
Figure 2:
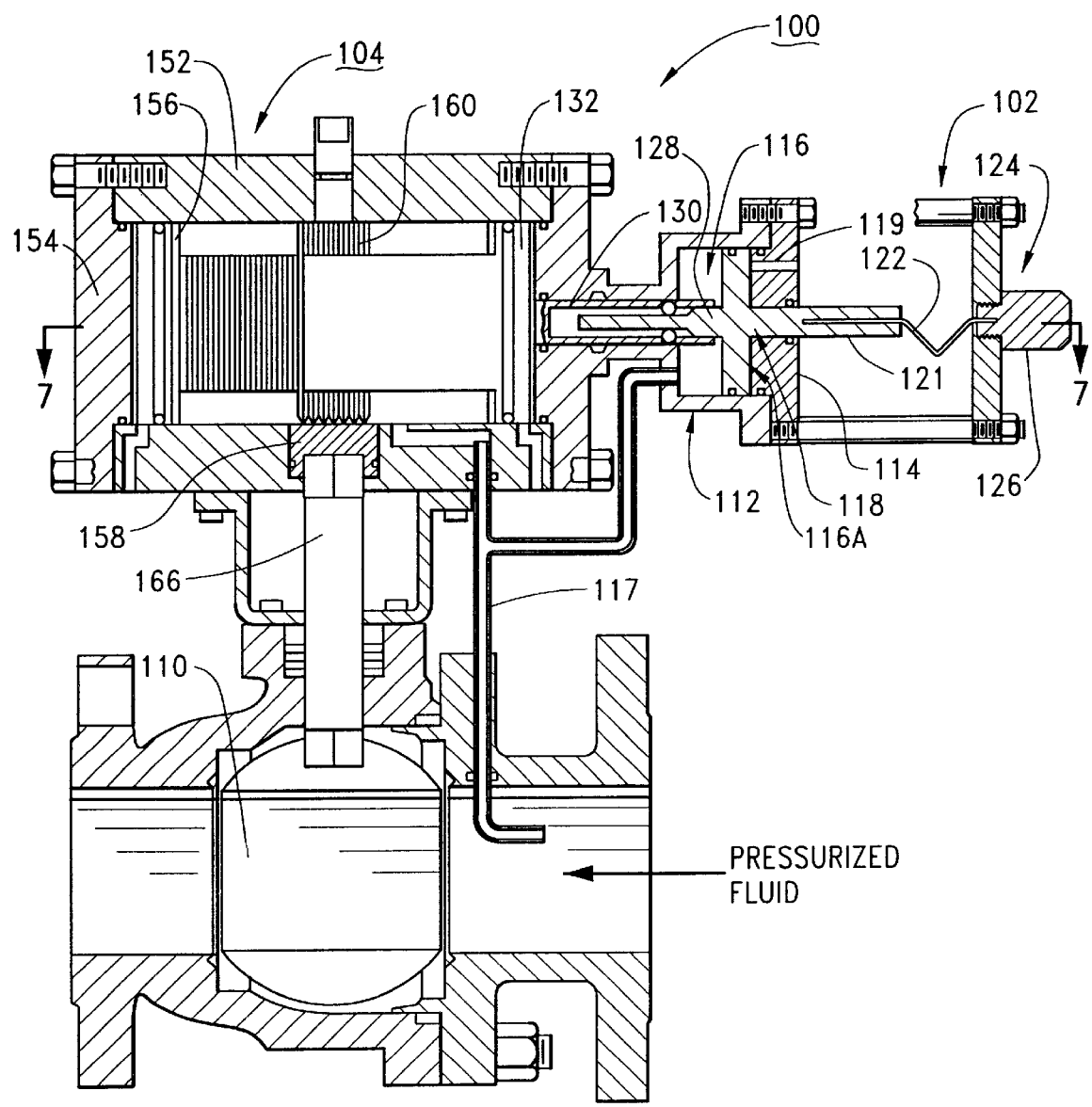
FIG. 2 shows the system of FIG. 1 in an overpressure condition with the pressure relief valve in an open position to establish an overpressure path for the pressurized fluid.

FIGS. 1 and 2 show a pressure relief system 100 constructed in accordance with preferred embodiments of the present invention. The pressure relief system 100 ("system") is preferably used as part of a larger pressurized fluid system in which a pressurized fluid is transported. The pressure relief system 100 is used to detect and abate an overpressure of the pressurized fluid and to provide an overpressure path for the fluid to reduce the possibility of injury to humans and damage to equipment.

The system 100 is shown to generally include a pressure response assembly 102, a rotary actuator assembly 104 and a valve assembly 106. The valve assembly 106 includes a normally closed (NC) ball valve 108 with a central flow-through aperture 110. The ball valve 108 is opened by the system 100 to provide a bypass path for the fluid (as shown in FIG. 2) in the event of an overpressure condition. It will be understood, however, that the ball valve 108 can alternatively be configured to be normally open (NO) so that the system 100 closes the valve to inhibit further flow of the pressurized fluid in response to an overpressure condition. Other valve configurations are also readily contemplated, including but not limited to the use of butterfly and plug-type valves.

The pressure response assembly 102 includes a body portion 112 which extends from the actuator assembly 104. A bonnet 114 is affixed to the body 112 opposite the actuator assembly 104. The body 112 and bonnet 114 cooperate to form a chamber having respective interior portions 116, 116A defined by opposing sides of a piston 120 of a trigger assembly 118. Pressurized fluid is introduced into the portion 116 (and into the actuator assembly 104) via conduit 117, as discussed below. The interior portion 116A includes vent passageways (such as 119) in communication with the surrounding atmosphere.

The trigger assembly 118 includes a pin support 121 which axially extends from the piston 120 and projects through a central aperture in the bonnet 114. A distal end of the pin support 121 captures and supports a collapsible member 122 which preferably comprises a buckling pin configured to fail (buckle) in accordance with Euler's Law. A distal end of the buckling pin 122 is captured and supported by a standoff assembly 124. A removable, threaded cap 126 allows an operator to remove a failed pin 122 (as shown in FIG. 2) and install a new, straight pin (as shown in FIG. 1).

The trigger assembly 118 further includes a generally pin-shaped member 128 which axially extends from the piston 120 in a direction opposite that of the pin support 121. Tile member 128 extends into a cylindrically shaped extension sleeve 130 which projects from a first slidable piston 132 of the actuator assembly 104, further details of which will be discussed below.

Figure 3:
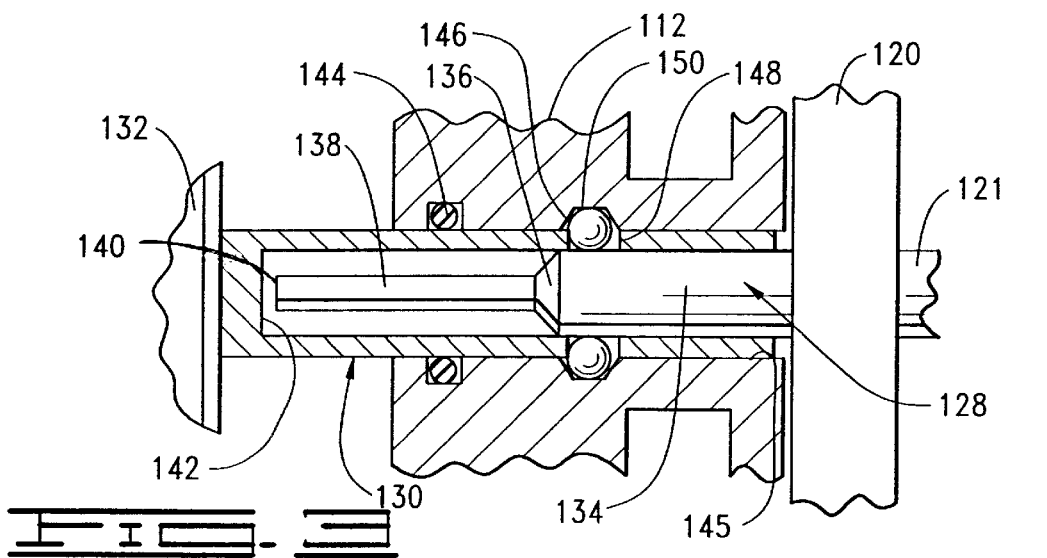
FIG. 3 is a cross-sectional view of portions of a pressure response assembly and an actuator assembly of the system of FIG. 1 in the steady state condition.
Figure 4:
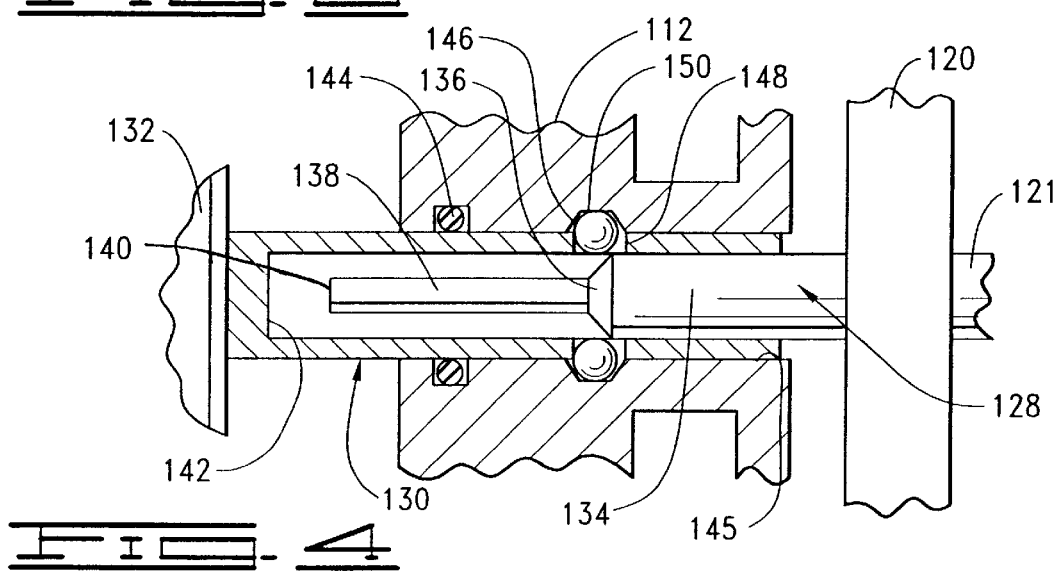
FIG. 4 shows the pressure response assembly and the actuator assembly of FIG. 3 in a transitional state between the steady state condition and the overpressure condition.
Figure 5:
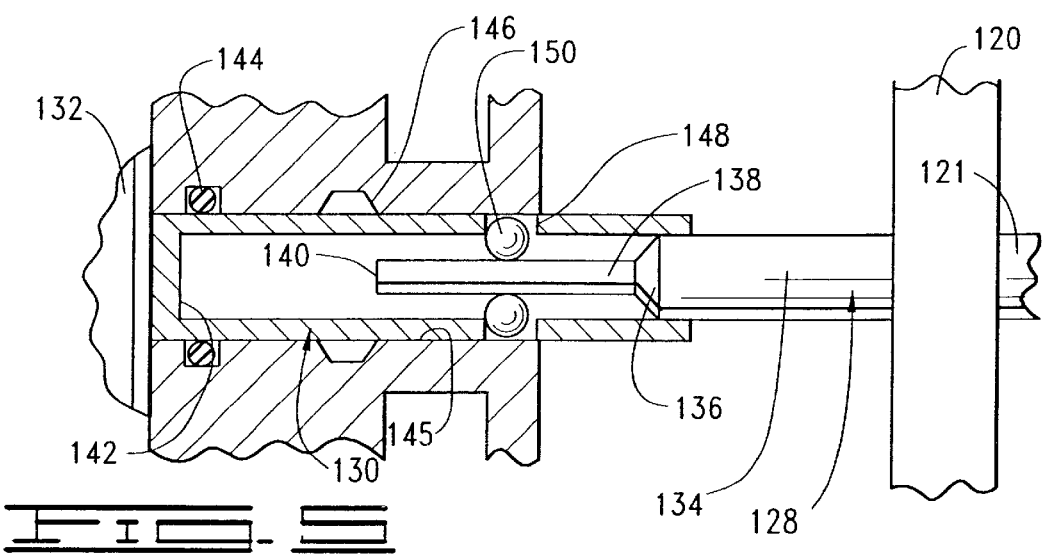
FIG. 5 shows the pressure response assembly and the actuator assembly of FIG. 3 in the overpressure condition.

The preferred construction and operation of the member 128 and the extension sleeve 130 can be seen with a review of FIGS. 3–5. For reference, these figures further show portions of the piston 120, the pin support 121 and the actuator assembly piston 132 previously introduced in FIGS. 1 and 2. FIG. 3 corresponds to the orientation of the system 100 in FIG. 1 (i.e., a steady state condition), FIG. 5 corresponds to the orientation of the system 100 in FIG. 2 (i.e., an overpressure condition), and FIG. 4 represents a transitional state between those of FIGS. 3 and 5.

The member 128 comprises a first stem portion 134 with a diameter substantially that of the interior diameter of the extension sleeve 130. The first stem portion 134 concludes with a chamfered shoulder 136 from which a second stem portion 138 extends. The second stem portion 138 has a diameter that is smaller than the diameter of the first stem portion 134. A facing surface 140 at the distal end of the second stem portion 138 comes into a close, noncontacting relationship with an interior base surface 142 of the extension sleeve 130. A seal 144 (preferably comprising a rubber o-ring) seals the interface between an interior surface 145 of the body portion 112 and the exterior surface of the extension sleeve 130.

The body portion 112 includes a plurality of recessed cavities 146 that extend into the body portion 112 from the interior surface 145. The cavities 146 align with apertures 148 in the extension sleeve 130 to accommodate a respective number of locking members (ball bearings) 150, as shown in FIG.3. While two opposing ball bearings 150 are shown in each of FIGS. 1–5, it will be understood that any number of ball bearings 150 (four, six, eight, etc.) can be angularly arrayed about the first stem portion 134 as desired.

The respective geometries of the ball bearings 150, the first stem portion 134, the extension sleeve 130 and the cavities 146 are selected to cause the ball bearings 150 to restrict axial movement of the extension sleeve 130 in a direction toward the plunger 120 when the first stem portion 134 is adjacent the ball bearings 150 (i.e., the steady state condition of FIG. 3). That is, because the width of the gap between the first stem portion 134 and the interior surface 145 of the housing 112 is smaller than the diameters of the ball bearings 150, the bearings 150 are retained within the recessed cavities 146 by the first stem portion 134 and prevent further advancement of the extension sleeve 130. In this way, the ball bearings 150 lock the actuator assembly 104 in place in the steady state condition.

At the same time, there is substantially no compressive force applied to the first stem portion 134 by the ball bearings 150, which allows the first stem portion 134 to freely slide past the bearings 150 once the fluid pressure exerted upon the piston 120 (via conduit 117) reaches the desired set point and initiates collapse of the buckling pin 122 (FIGS. 1 and 2). As the shoulder 136 passes the ball bearings 150 (FIG. 4), the clearance provided by the second stem portion 138 is sufficient to allow the ball bearings 150 to be advanced out of the recessed cavities 146 by the extension sleeve 130. The actuator assembly 104 becomes "unlocked" at this point and the extension sleeve 130 advances the bearings 150 along the interior surface 145 of the body portion 112 until further movement of the extension sleeve 130 is impeded, such as by contact of the first actuator piston 132 with the body portion 112 (as shown in FIGS.2 and 5).

The member 128, the extension sleeve 130 and the bearings 150 thus generally cooperate in a manner similar to a "quick disconnect" coupling. Forces associated with the actuator assembly 104 and the valve assembly 106 do not undesirably raise the set point of the buckling pin 122 because of the fact that the bearings 150 lock axial movement of the extension sleeve 130 and at the same time permit substantially free axial movement of the member 128, and because the extension sleeve 130 and the trigger member 128 are not otherwise directly coupled (note, for example, the gap between the surfaces 140 and 142 in FIG. 3). For completeness, it will be observed that directly coupling the trigger member 128 and the extension sleeve 130 (such as, for example, by having the surface 140 contact the surface 142) would allow translation of compressive forces from the actuator assembly 104 to the buckling pin 122, thereby offsetting the compressive forces applied to the pin 122 by the pressurized fluid acting upon piston 120 and undesirably raising the set point at which mechanical collapse occurs.

FIG. 6 shows a cross-sectional view of the actuator assembly 104 as generally taken along line 6—6 in FIG. 1 (the pressure response assembly 102 of FIG. 1 has been omitted for purposes of clarity). An actuator body portion 152 cooperates with a flange 154 and the pressure response assembly body portion 112 to provide a sealed actuator assembly housing. Pressurized fluid from the conduit 117 (FIG. 1) enters the actuator assembly housing between the first actuator piston 132 and a second actuator piston 156. The pistons 132, 156 are configured for sliding movement toward opposing ends of the actuator assembly housing from a retracted position to an extended position.

An actuator shaft 158 is transversely mounted by the body portion 152 and supports a pinion 160 (elongated rotary gear) which engages racks 162, 164 (teeth) in the respective pistons 132, 156. The actuator shaft 140 is directly coupled to a valve shaft 166 (FIG. 1), which is in turn directly coupled to the ball valve 108. In this way, rotation of the actuator shaft 158 results in rotation of the ball valve 108 to the final desired position. FIG. 7 shows the actuator assembly 104 in the fully extended position. For reference, FIG. 7 generally corresponds to the cross-sectional view taken along line 7—7 in FIG. 2.

FIGS. 8 and 9 provide an alternative actuator assembly 204 that can be used in lieu of the actuator assembly 104 discussed above. FIG. 8 shows the actuator assembly 204 in a retracted position corresponding to the steady state condition of FIG. 1; FIG. 9 shows the actuator assembly 204 in an extended position corresponding to the overpressure condition of FIG. 2.

The actuator assembly 204 includes a body portion 206 that cooperates with a flange 208 and the pressure response assembly body portion 112 to form a sealed housing. A single plunger-type piston 210 is arranged for sliding movement within the body portion 206 and supports the aforedescribed extension sleeve 130.

An interior chamber 212 accommodates a transversally mounted shaft 214 upon which a pinion 216 is mounted. A rack 218 of the piston 210 engages the pinion 216 as shown. Pressurized fluid is introduced into the actuator housing via port 220 to exert pressure on the piston 210.

The actuator assembly 204 is particularly useful in environments where dirty fluids (i.e. corrosive or otherwise contaminating fluids) are used, since the pressurized fluid does not come into contact with the rack 218 and pinion 216 and thus does not interfere with the operation or reliability of the system 100 over time.

Figures 10, 11:
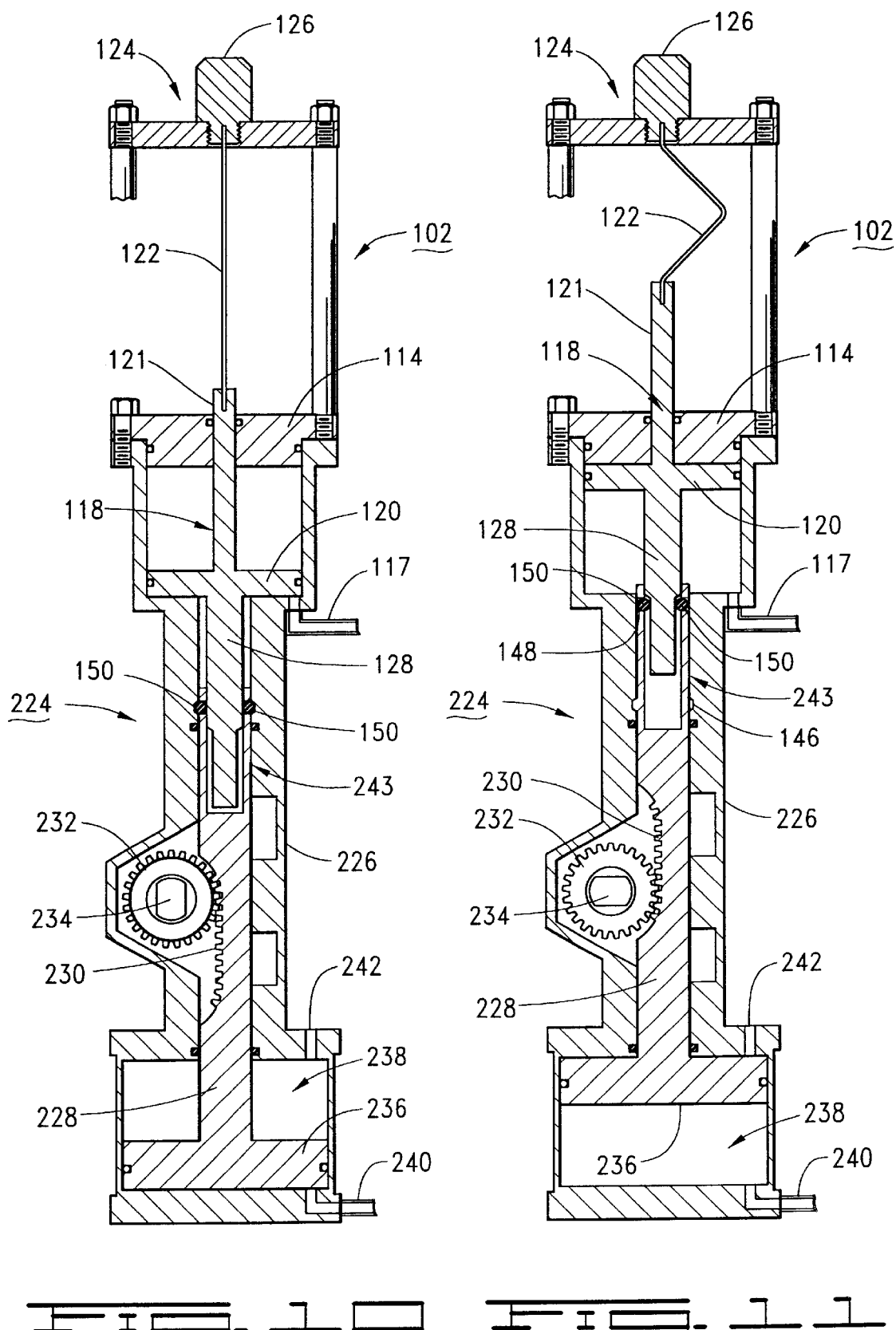
FIG. 10 is a cross-sectional view of another alternative actuator assembly in a steady state condition.
FIG. 11 is a cross-sectional view of the actuator assembly of FIG. 10 in an overpressure condition.

FIGS. 10 and 11 show yet another actuator assembly 224 which can be used in lieu of the alternative configurations discussed above. The actuator assembly 224 is shown in conjunction with the aforedescribed pressure response assembly 102 and is configured to open the valve assembly 108 in generally the same manner as discussed above for the actuator assemblies 104, 204. FIG. 10 shows the actuator assembly 224 in the retracted position, and FIG. 11 shows the actuator assembly 224 in the extended position. As with the actuator assembly 204, the actuator assembly 224 is also useful in an environment where dirty fluids are used.

The actuator assembly 224 includes an elongated body portion 226 housing a piston 228. The piston 228 includes a rack 230 which engages a pinion 232 mounted to a shaft 234. The piston 218 further has a plunger 236 at one end which is slidable within a chamber 238 of the body portion 226. Pressurized fluid is introduced into the chamber via port 240 and atmospheric air within the chamber 228 is vented through port 242. The piston 228 is provided with a extension sleeve 243 which is generally similar to the extension sleeve 130 and which cooperates with the trigger member 128 of the pressure response assembly 102 as discussed above.

Figures 12, 13:
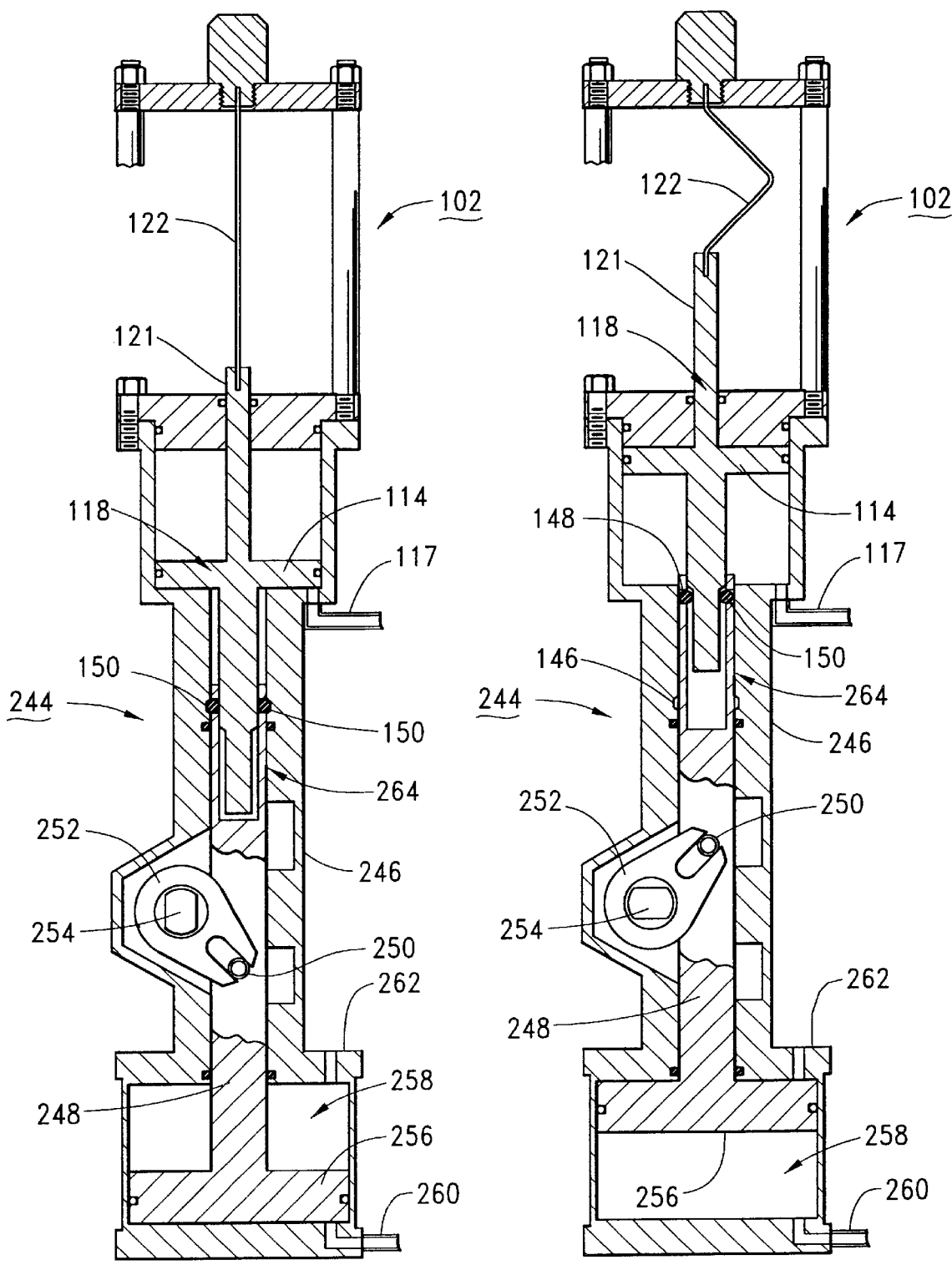
FIG. 12 is a cross-sectional view of yet another alternative actuator assembly in a steady state condition.
FIG. 13 is a cross-sectional view of the actuator assembly of FIG. 12 in an overpressure condition.

FIGS. 12 and 13 provide yet another alternative actuator assembly 244 which employs a Scotch yoke arrangement in lieu of a rack and pinion arrangement. The actuator assembly 244 includes an elongated body portion 246 housing a piston 248. The piston 248 supports a cylindrical roller 250 which is engaged by a yoke 252 as shown. The yoke 252 is mounted to a shaft 254 which in turn is coupled to the valve shaft 116 (FIG. 1). Movement of the actuator assembly 244 to the extended position (FIG. 13) induces a camming action which rotates the ball valve 108 to the desired position.

A plunger 256 is slidable within a chamber 258 of the body portion 246. Pressurized fluid is introduced into the chamber 258 via port 260 and atmospheric air within the chamber 258 is vented through port 262. The piston 248 further includes a extension sleeve 264 opposite the piston 248 which cooperates with the member 128 of the pressure response assembly 102 as discussed above.

Having now concluded a discussion of various alternative constructions of the system 100, operational considerations will now be briefly addressed. As will be recognized by those skilled in the art, buckling pins such as 122 generally provide well controlled response characteristics to axially directed compressive forces. The axial force sufficient to cause the buckling pin 122 to buckle is the "buckling limit." The buckling limit depends on the modulus of elasticity of the material of the buckling pin and the particular geometry for the buckling pin.

Figure 14:
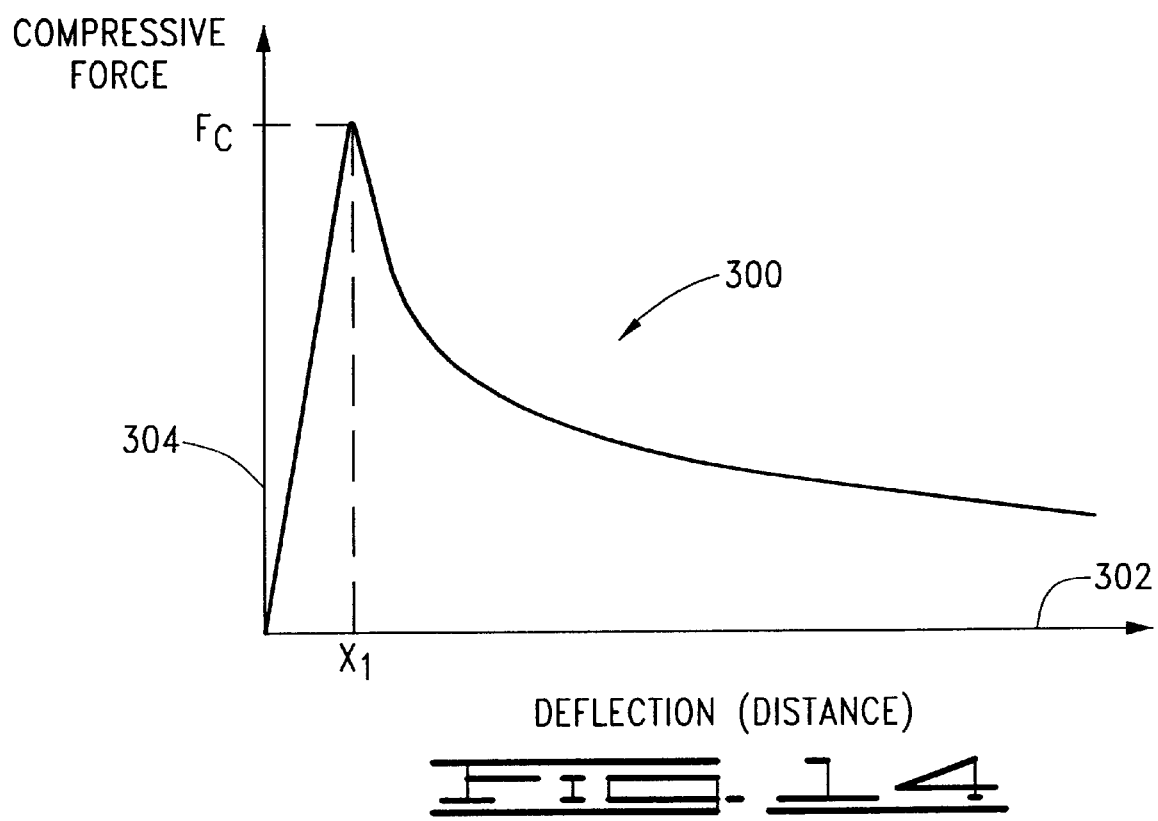
FIG. 14 is a graphical illustration of a force versus deflection curve to generally illustrate force required to deflect and ultimately collapse a buckling pin of the system of FIG. 1.

FIG. 14 provides a generalized graphical representation of a buckling pin deflection curve 300 plotted against a deflection distance x-axis 302 and a compressive force magnitude y-axis 304. Compressive forces below a critical force Fc will tend to allow the buckling pin 122 to remain within its elastic limit. Thus, increases in compressive force up to the critical force Fc will impart a slight bowing to the pin 122, but a relaxation of the compressive force will allow the pin 122 to return to the original straight configuration.

However, once the critical force Fc is reached (i.e., axial deflection reaches a distance X1), the pin 122 will begin to buckle (mechanically fail). The amount of force thereafter required to continue buckling of the pin is not constant, but drops off rapidly as shown by curve 300.

It will now be seen that an advantage of the present invention (as embodied herein) is the isolation of system forces relating to the activation of the valve assembly 106 from the compressive forces acting upon the buckling pin 122. Another advantage is that the actuator assembly is preferably precharged with the pressurized fluid, so that activation of the valve can take place quickly once the retaining support of the buckling pin 122 is removed.

Although various embodiments have been presented herein, it will be understood that numerous changes and modifications arc readily contemplated and not listed herein for brevity. For example, it will be understood that any number of different mechanical linkages can be used within the actuator assembly to activate the valve. Moreover, although a rotary activation has been described, such is not necessarily limiting to the scope of the appended claims. Other pressure responsive members such as a shear pin or a frangible disk can readily be used in place of the buckling pin disclosed herein. The use of ball bearings (such as 150) as retention members to facilitate the relative movement of the member 128 and extension sleeve 130 is preferred, but other configurations of retention members (Such as rollers or bushings) can also be employed.

For purposes of the appended claims, mechanical failure will be understood as describing, for example, the buckling of a buckling pin such as 122, the shearing of a shear pin, or the bursting of a disc membrane. Overpressure path will be understood to describe a redirection of the flow of the pressurized fluid, such as by a bypass path (as shown in FIG. 2) or a shutdown (interruption) in the original flow. Other piston-shaft coupling arrangements besides a rack and pinion arrangement to generate a torque are readily contemplated and are well within the ability of those skilled in the art to implement, such as configurations using belts, springs, chain drives, or linkages.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A pressure relief system for detecting and abating an overpressure condition in a pressurized fluid, comprising:

a housing having a housing interior surface which defines a housing interior chamber, said housing interior chamber extending along a selected axis;

an actuator assembly configured to establish an overpressure path for the pressurized fluid when a pressure of the pressurized fluid reaches a predetermined level, the actuator assembly comprising an extension sleeve which extends into and along the housing interior chamber, the extension sleeve having an extension sleeve outer surface in close proximity to the housing interior surface, the extension sleeve further having an extension sleeve interior surface which defines an extension sleeve interior chamber, said extension sleeve interior chamber extending along the selected axis;

a pressure response assembly comprising a pressure responsive member configured to mechanically fail in response to application of a compressive force established when the pressurized fluid reaches the predetermined level, the pressure response assembly further comprising a trigger member coupled to the pressure responsive member, the trigger member extending into and along the extension sleeve interior chamber, the trigger member comprising a first stem portion having a first stem outer surface in close proximity to the extension sleeve interior surface; and a retention member adjacent the first stem portion of the trigger member and which extends through an aperture in the extension sleeve and into a recessed cavity formed in the housing interior surface, wherein the retention member prevents axial movement of the extension sleeve along the selected axis while the first stem portion remains adjacent the retention member, wherein upon mechanical failure of the pressure responsive member the first stem portion is advanced along the selected axis past the retention member to allow the extension sleeve to advance the retention member out of the recessed cavity and along the housing interior chamber as the extension sleeve moves along the selected axis, and wherein the overpressure path for the pressurized fluid is established by the actuator assembly as the extension sleeve moves along the selected axis.

2. The system of claim 1, wherein the trigger member further comprises a second stem portion extending from the first stem portion and having a second stem outer surface, wherein the first stem outer surface is disposed at a first distance from the extension sleeve interior surface and wherein the second stem outer surface is disposed at a second distance from the extension sleeve interior surface greater than the first distance, the second distance selected so that the extension sleeve advances the retention member along the housing interior chamber between the housing interior surface and the second stem outer surface.

3. The system of claim 1, wherein the pressure response assembly further comprises a piston coupled to the pressure responsive member and to the trigger member, the piston disposed within a second interior chamber of the housing, wherein a portion of the pressurized fluid is introduced into the second interior chamber of the housing so that, when the pressure of the pressurized fluid reaches the predetermined level, the piston applies a sufficient compressive force upon the pressure responsive member to induce mechanical failure of the pressure responsive member and advance along the second interior chamber.

4. The system of claim 1, wherein the actuator assembly comprises an actuator assembly housing which defines an actuator assembly interior chamber and an actuator piston slidable within the actuator assembly housing, the actuator piston coupled to the extension sleeve, wherein a portion of the pressurized fluid is introduced into the actuator assembly interior chamber to bear against the actuator piston so that a compressive force is applied to the retaining member by the extension sleeve.

5. The system of claim 4, wherein the actuator assembly further comprises an actuator shaft coupled to the actuator piston, wherein movement of the actuator piston along the actuator assembly interior chamber induces rotation of the actuator shaft, and wherein rotation of the actuator shaft establishes the overpressure path for the pressurized fluid.

6. The system of claim 5, further comprising a rotatable valve assembly coupled to the actuator shaft, wherein rotation of the actuator shaft results in movement of the rotatable valve assembly from an open position to a closed position or from a closed position to an open position.

7. The system of claim 5, wherein the actuator piston comprises a rack that engages a pinion mounted to the actuator shaft.

8. The system of claim 1, wherein the retention member comprises a ball bearing.

9. The system of claim 1, wherein the pressure responsive member comprises a buckling pin.

10. The system of claim 1, wherein the retention member comprises a first retention member, wherein the system comprises an additional plurality of retention members arrayed in corresponding apertures in the extension sleeve and in corresponding recessed cavities in the housing interior surface.

11. A pressure relief system for detecting and abating an overpressure condition in a pressurized fluid, comprising:

a housing having a housing interior surface which defines a housing interior chamber, said housing interior chamber extending along a selected axis;

an actuator assembly configured to establish an overpressure path for the pressurized fluid when a pressure of the pressurized fluid reaches a predetermined level, the actuator assembly comprising an extension sleeve which extends into and along the housing interior chamber, the extension sleeve having an extension sleeve outer surface in close proximity to the housing interior surface, the extension sleeve further having an extension sleeve interior surface which defines an extension sleeve interior chamber, said extension sleeve interior chamber extending along the selected axis;

a pressure response assembly comprising a pressure responsive member configured to mechanically fail in response to application of a compressive force established when the pressurized fluid reaches the predetermined level, the pressure response assembly further comprising a trigger member coupled to the pressure responsive member, the trigger member extending into and along the extension sleeve interior chamber, the trigger member comprising a first stem portion having a first stem outer surface in close proximity to the extension sleeve interior surface; and first means for preventing axial movement of the extension sleeve along the selected axis while the pressure of the pressurized fluid remains below the predetermined level and for allowing axial movement of the extension sleeve along the selected axis when the pressure of the pressurized fluid reaches the predetermined level.

12. The system of claim 11, wherein the first means comprises a retention member adjacent the first stem portion of the trigger member and which extends through an aperture in the extension sleeve and into a recessed cavity formed in the housing interior surface, wherein the retention member prevents axial movement of the extension sleeve along the selected axis while the first stem portion remains adjacent the retention member, wherein upon mechanical failure of the pressure responsive member the first stem portion is advanced along the selected axis past the retention member to allow the extension sleeve to advance the retention member out of the recessed cavity and along the housing interior chamber as the extension sleeve moves along the selected axis, and wherein the overpressure path for the pressurized fluid is established by the actuator assembly as the extension sleeve moves along the selected axis.

13. The system of claim 12, wherein the retention member comprises a ball bearing.

14. The system of claim 12, wherein the trigger member further comprises a second stem portion extending from the first stem portion and having a second stem outer surface, wherein the first stem outer surface is disposed at a first distance from the extension sleeve interior surface and wherein the second stem outer surface is disposed at a second distance from the extension sleeve interior surface greater than the first distance, the second distance selected so that the extension sleeve advances the retention member along the housing interior chamber between the housing interior surface and the second stem outer surface.

15. The system of claim 11, wherein the pressure response assembly further comprises a piston coupled to the pressure responsive member and to the trigger member, the piston disposed within a second interior chamber of the housing, wherein a portion of the pressurized fluid is introduced into the second interior chamber of the housing so that, when the pressure of the pressurized fluid reaches the predetermined level, the piston applies a sufficient compressive force upon the pressure responsive member to induce mechanical failure of the pressure responsive member and advance along the second interior chamber.

16. The system of claim 11, wherein the actuator assembly comprises an actuator assembly housing which defines an actuator assembly interior chamber and an actuator piston slidable within the actuator assembly housing, the actuator piston coupled to the extension sleeve, wherein a portion of the pressurized fluid is introduced into the actuator assembly interior chamber to bear against the actuator piston.

17. The system of claim 16, wherein the actuator assembly further comprises an actuator shaft coupled to the actuator piston, wherein movement of the actuator piston along the actuator assembly interior chamber induces rotation of the actuator shaft, and wherein rotation of the actuator shaft establishes the overpressure path for the pressurized fluid.

18. The system of claim 17, further comprising a rotatable valve assembly coupled to the actuator shaft, wherein rotation of the actuator shaft results in movement of the rotatable valve assembly from an open position to a closed position or from a closed position to an open position.

19. The system of claim 17, wherein the actuator piston comprises a rack that engages a pinion mounted to the actuator shaft.

20. The system of claim 11, wherein the pressure responsive member comprises a buckling pin.

* * * * *